(No Model.) 2 Sheets—Sheet 2.
J. O. SHRINER.
DETACHABLE STRAINER FOR DOWN SPOUTS.
No. 533,563. Patented Feb. 5, 1895.

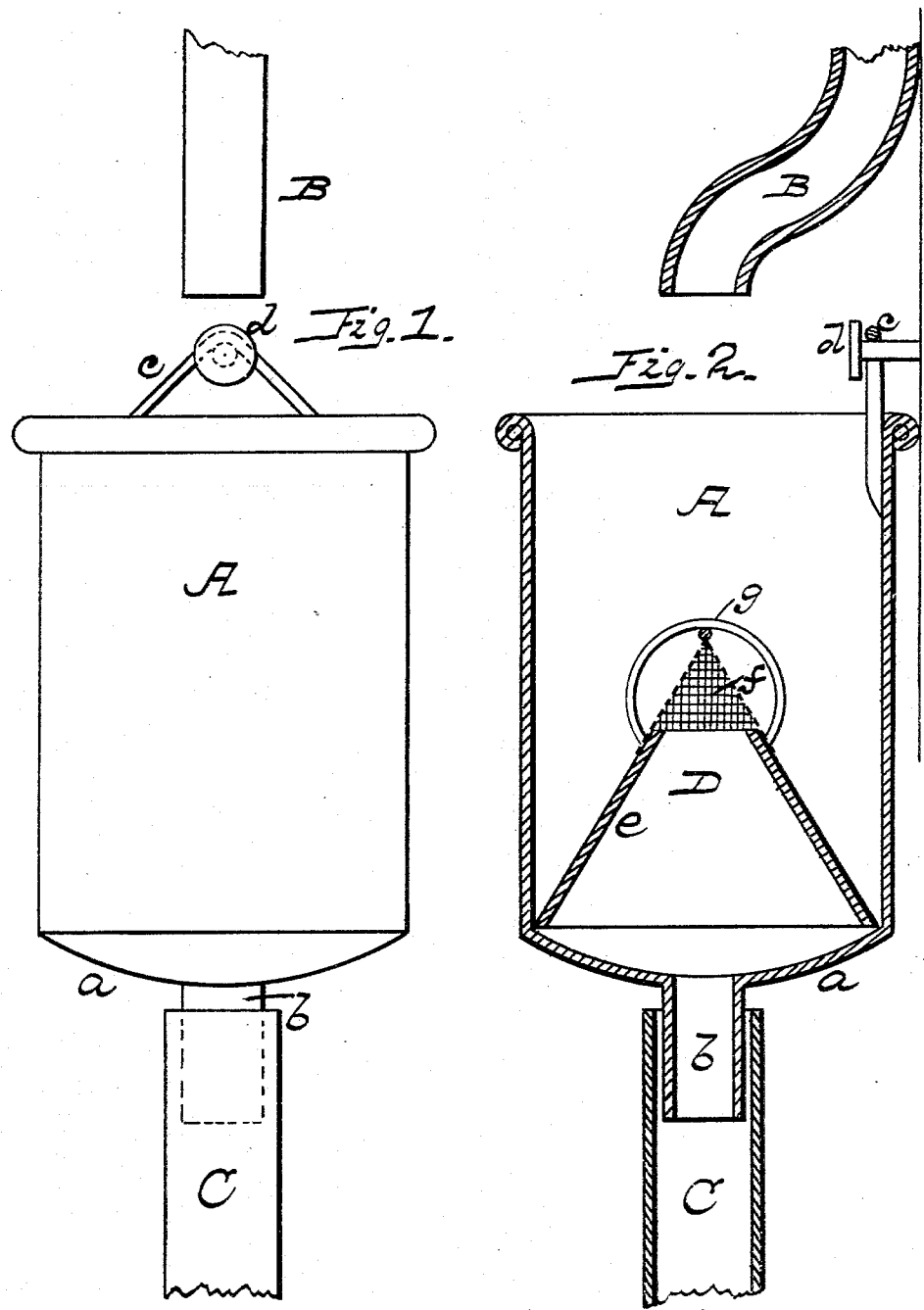

WITNESSES
Jas. B Clarke
M. M. Martin

INVENTOR.
J. O. Shriner
by E. H. Bates Attorney

UNITED STATES PATENT OFFICE.

JOHN O. SHRINER, OF NEW CASTLE, INDIANA.

DETACHABLE STRAINER FOR DOWNSPOUTS.

SPECIFICATION forming part of Letters Patent No. 533,563, dated February 5, 1895.

Application filed August 3, 1894. Serial No. 519,406. (No model.)

*To all whom it may concern:*

Be it known that I, JOHN O. SHRINER, a citizen of the United States, residing at New Castle, in the county of Henry and State of Indiana, have invented certain new and useful Improvements in Detachable Strainers for Downspouts; and I do hereby declare the following to be a full, clear, and exact description of the invention, such as will enable others skilled in the art to which it appertains to make and use the same.

This invention has relation to improvements in devices applicable to down spouts of buildings and it consists in the novel construction, combination and arrangements of parts of which it is composed, all as will be hereinafter fully described.

The annexed drawings, to which reference is made, fully illustrate my invention, in which—

Figure 3:
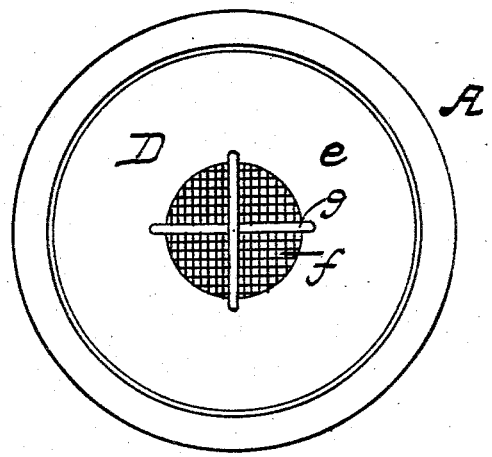
Figure 4:
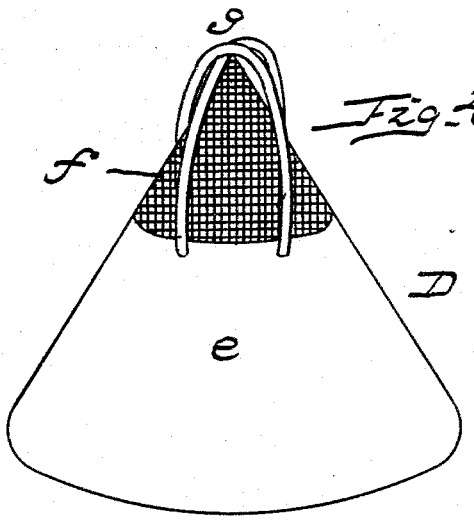

Figure 1, represents a front view of my device. Fig. 2, is a vertical sectional view of the same. Fig. 3 is a plan view of the strainer, detached from the receptacle and Fig. 4 is a perspective view of the same.

Referring by letter to the accompanying drawings, A, designates a receptacle; B, the lower end of a down spout of a building; C, the lead spout from the receptacle, and D the strainer.

The receptacle A, is constructed with an open top and a concave bottom $a$ from which extends a short tube or pipe $b$ which opens into said bottom, and connects with the lead pipe C, and secured to the top rim of the receptacle is a loop $c$ which engages a nail $d$ on the building and by which the receptacle is held in position. Within this receptacle is arranged a detachable strainer D, composed of a flaring solid portion $e$, the strainer proper $f$ and wire guard $g$; the latter arranged above the strainer and secured at its lower end to the solid portion aforesaid. The upper portion or wire sieve is also secured to the flaring or body portion, thus confining the three parts to one another. These guards also serve to provide a handle for the sieve or strainer in removing it from the receptacle and replacing it therein.

It will be seen that the receptacle is held in position by the loop on the nail, and the rain water from a roof coming down the down spout enters the receptacle and is strained as it passes through and out into the lead pipe, the guard preventing the wire gauze from being injured by sticks, leaves, &c., from the roof, which fall to one side of the cone and remain in the receptacle until taken out. The cone can also be taken out, cleaned and replaced, and a strainer as herein described is durable as well as cheap to manufacture.

What I claim is—

The combination with the spout, a detachable receptacle having a concave bottom with an outlet tube, of a detachable strainer having a solid body portion, with an upper gauze portion, and a guard secured to said solid portion of said strainer, above said gauze portion, said guard also serving to remove the strainer from the receptacle, substantially as shown and described.

In testimony whereof I affix my signature in presence of two witnesses.

JOHN O. SHRINER.

Witnesses:
WILLIAM O. BARNARD,
J. M. MOORE, Jr.